United States Patent [19]

Sakamoto

[11] Patent Number: 5,445,307
[45] Date of Patent: Aug. 29, 1995

[54] METHOD OF CORRECTING THE PARTIALLY WORN DIE MOUNTING SURFACES OF THE PLATENS OF A DIE CASTING MACHINE

[75] Inventor: Koji Sakamoto, Nagoya, Japan

[73] Assignee: Tokushu Denkyoku Company Ltd., Hyogo, Japan

[21] Appl. No.: 224,976

[22] Filed: Apr. 8, 1994

[51] Int. Cl.6 .................................................. B23P 6/00
[52] U.S. Cl. .................................. 228/119; 228/160; 409/175; 29/402.18
[58] Field of Search ................... 228/119, 160, 162; 29/402.18; 409/175

[56] References Cited

U.S. PATENT DOCUMENTS

| | | | |
|---|---|---|---|
| 2,914,346 | 11/1959 | Ryder | 228/125 X |
| 3,477,341 | 11/1969 | Rickenbrode | 409/175 |
| 4,234,275 | 11/1980 | Clement | 409/175 |
| 4,903,888 | 2/1990 | Clark et al. | 228/160 X |
| 4,958,431 | 9/1990 | Clark et al. | 29/402.18 |

Primary Examiner—Kenneth J. Ramsey
Attorney, Agent, or Firm—Oblon, Spivak, McClelland, Maier, & Neustadt

[57] ABSTRACT

A method of correcting the partially worn die mounting surfaces of the stationary and the movable platen of a die casting machine is capable of correcting the partially worn die mounting surfaces through comparatively simple processes in a comparatively short time without dismounting the stationary and the movable platens from the die casting machine. The method comprises steps of padding welding areas including partially worn areas and areas surrounding the partially worn areas in the die mounting surfaces of the platens on the die casting machine by build-up welding, disposing a compact, portable face cutting machine near the platens, and cutting the padded areas by the face cutting machine to finish the die mounting surfaces of the platens in a desired flatness in the range of 1/100 to 1/10 mm. The build-up welding is carried out under welding conditions realizing a welding heat input of 15,000 J/cm or below to prevent inducing residual stress in the platens.

6 Claims, 4 Drawing Sheets

METHOD OF CORRECTING THE PARTIALLY WORN DIE MOUNTING SURFACES OF THE PLATENS OF A DIE CASTING MACHINE

BACKGROUND OF THE INVENTION

1. Field of the Invention

The present invention relates to a method of correcting the partially worn die mounting surfaces of the platens of a die casting machine and, more specifically, to a method of correcting the partially worn die mounting surfaces of the cast iron or cast steel platens of a die casting machine.

2. Description of the Related Art

The die mounting surfaces of the stationary platen and the movable platen (which will be referred to inclusively as "platens"), formed of cast iron or cast steel used on a die casting machine in an aluminum die casting foundry are subject to partial wear. The depth of partial wear in several years of service is in the range of about 0.3 to 4 mm with the die mounting surface of the stationary platen (hereinafter, referred to as "stationary die mounting surface") and in the range of about 0.3 to 4 mm with the die mounting surface of the movable platen (hereinafter, referred to as "movable die mounting surface"). Accordingly, the partial clearance, i.e., the clearance which is formed when the stationary platen and the movable platen are joined together between the partially worn stationary die mounting surface of the stationary platen and the partially worn movable die mounting surface of the movable platen, is in the range of about 0.3 to about 8 mm.

When the stationary die mounting surface and the movable die mounting surface are partially worn in such a depth, the clamping pressure is applied unevenly to the die, and consequently, casting fins are formed. Casting fins clog the air vent grooves of the die, causing air to be entrapped in the molten metal and causing backflash. Backflash entails loss in the following process and defects in the casting, and may cause troubles. The stationary die mounting surface and the movable die mounting surface must be always kept in a high flatness to prevent such problems.

Around the time when such problems are liable to occur, the partial wear in the surfaces of the platens, i.e., the stationary die mounting surface and the movable die mounting surface, is corrected. Generally, the partial wear in the surfaces of the platens is corrected by a surface correcting method including taking the die casting machine apart to remove the platens from the die casting machine, transporting the platens to the machining shop of the maker of the die casting machine or to the maintenance shop of the die casting machine, machining the surfaces of the platens by an ordinary face cutting machine, such as a shaper, installed in the machining shop to finish the partially worn surfaces of the platens in a high flatness, transporting the thus finished platens to the die casting foundry, and mounting the platens on the die casting machine. The die mounting surfaces of the platens must be finished in a flatness within 1/10 mm.

The recent change in the mold lubricant for lubricating the die held on the platens of the die casting machine, namely, the replacement of oil mold lubricants with water mold lubricants, to prevent fire hazard has reduced the service time in which the depth of partial wear in the die mounting surfaces of the platens increases to a limit. The service time was in the range of about five years to about six years when oil mold lubricants were used, whereas the service time is only about one year when water mold lubricants are used. Therefore, the partial wear in the die mounting surfaces of the platens must be corrected more frequently in recent years than before.

The aforesaid conventional surface correcting method has problems that the correction of the die mounting surfaces needs many steps, requires a very long time in the range of one month to three months from the first step of taking the die casting machine apart to the last step of mounting the platens on the die casting machine, troublesome work for taking the die casting machine apart and assembling the same and much expenses, and hence is economically disadvantageous. Since the service time in which the partial wear in the die mounting surfaces of the platens increases to a limit has been reduced and the die mounting surfaces of the platens need more frequent correction than before, the foregoing problems are more serious problems in recent years.

SUMMARY OF THE INVENTION

The present invention has been made in view of the foregoing problems in the conventional surface correcting method and it is therefore an object of the present invention to provide an economically advantageous method of correcting the partially worn die mounting surfaces of the platens of a die casting machine, capable of solving the problems in the conventional surface correcting method, of correcting the partially worn surfaces of the platens in a comparatively short time and of correcting the partially worn surfaces of the platens by a reduced number of processes, and requiring comparatively simple work.

With the foregoing object in view, a method of correcting the partially worn die mounting surfaces of the stationary platen and the movable platen of a die casting machine in a first aspect of the present invention comprises: locally padding areas including partially worn areas and areas surrounding the partially worn areas in the die mounting surfaces of the cast iron or cast steel platens mounted on the die casting machine by build-up welding, installing a compact, portable face cutting machine near the platens, cutting the locally padded areas by the portable face cutting machine to finish the die mounting surfaces in a high flatness.

In a second aspect of the present invention, in the method of correcting the partially worn die mounting surfaces of the stationary platen and the movable platen of a die casting machine, the stationary and the movable platen are formed of cast iron, and a low-temperature, coated electrode containing Ni as a principal component, i.e., a low-temperature, Ni-base coated electrode, having a Ni content of 50% or above is used for the build-up welding, and the build-up welding is carried out under welding conditions realizing a welding heat input of 15,000 J/cm or below.

In a third aspect of the present invention, in the method of correcting the partially worn die mounting surfaces of the stationary platen and the movable platen of a die casting machine, the stationary and the movable platen are formed of cast steel, and a stainless steel welding material is used for the build-up welding, and the build-up welding is carried out under welding conditions realizing a welding heat input of 15,000 J/cm or below.

In a fourth aspect of the present invention, in the method of correcting the partially worn die mounting surfaces of the stationary platen and the movable platen of a die casting machine, the portable face cutting machine is disposed between the respective mounting surfaces of the stationary platen and the movable platen.

In the foregoing methods of correcting the partially worn die mounting surfaces of the stationary platen and the movable platen of a die casting machine in accordance with the present invention, the respective die mounting surfaces of the stationary and the movable platen are finished by the portable face cutting machine in a flatness in the range of 1/100 to 1/10 mm.

According to the present invention, when correcting the partially worn die mounting surfaces of the platens of a die casting machine, the stationary and the movable platens formed of cast iron or cast steel are not removed from the die casting machine, areas including the partially worn areas and areas surrounding the partially worn areas are padded by build-up welding, the compact, portable face cutting machine is disposed near the platens, and then the padded areas are machined by the portable face cutting machine to finish the die mounting surfaces of the platens in a high flatness. Accordingly, the work for removing the platens from the die casting machine, transporting the platens to the machining shop and mounting the platens on the die casting machine is unnecessary, so that the time necessary for correcting the partially worn die mounting surfaces of the platens is reduced, the number of processes of the method is smaller than that of the processes of the conventional method, the work is comparatively simple, and the method is economically advantageous.

Since the cutting capacity of the compact, portable face cutting machine employed in the present invention is necessarily smaller than that of the ordinary stationary face cutting machine, the machining allowance must be smaller for the compact portable face cutting machine than for the ordinary stationary face cutting machine to finish the die mounting surfaces of the platens by the compact, portable face cutting machine in a time equal to or shorter than a time required by the ordinary stationary face cutting machine for finishing the same by the conventional method. Therefore, the distortion of the platens due to build-up welding must be suppressed to the least possible extent.

When padding the platens by build-up welding, it is desirable, to suppress the distortion of the platens to the least possible extent, to use a low-temperature, Ni-base coated electrode having a Ni content of 50% or above and to limit the welding heat input to 15,000 J/cm or below when the platens are formed of cast iron, and to use a stainless steel welding material and to limit the welding heat input to 15,000 J/cm or below when the platens are formed of cast steel. When the platens are padded by build-up welding under such welding conditions, weld cracks will not be formed in the platens and the residual stress in the padded platens is comparatively small even if the platens are not preheated. Consequently, the platens need not be preheated before build-up welding, the distortion of the platens attributable to preheating can be perfectly prevented, and the distortion of the platens during build-up welding is suppressed because the welding heat input is small.

When the platens are formed of cast iron, the low-temperature, Ni-base coated electrode having a Ni content of 50% or above is used because it is possible that weld cracks are formed in the weld if the Ni content of the low-temperature, Ni-base coated electrode is less than 50%, and the welding heat input is limited to 15,000 J/cm or below because it is possible that the platens are distorted and the distortion of the platens increases the time required for the face machining operation if the welding heat input is higher than 15,000 J/cm. When the platens are formed of cast steel, the welding heat input is limited to 15,000 J/cm or below for the same reason. Low-temperature, Ni-base coated electrodes having a Ni content of 50% or above are, for example, low-temperature coated Ni electrodes and low-temperature, coated Fe-Ni electrodes. The welding heat input is calculated by using an expression:

$$\text{(Welding heat input)} = 60EI/v \qquad (1)$$

where E is welding voltage, I is welding current and v is welding speed.

Omission of the preheating process through the employment of the foregoing welding conditions is particularly advantageous, because it is difficult to preheat the platens properly on the die casting machine and hence it is desirable to carry out build-up welding properly without requiring the preheating of the platens. The build-up welding of the die mounting surfaces of the platens by using the low-temperature Ni-base coated electrode having a Ni content of 50% or above or the stainless steel welding material enhances the corrosion resistance of the die mounting surfaces of the platens.

Since the face cutting machine employed in the present invention is portable and has a small construction, the face cutting machine can be disposed close to the die mounting surfaces between the stationary platen and the movable platen, and the disposition of the face cutting machine close to the die mounting surfaces of the platens makes it easy to finish the die mounting surfaces in a satisfactory flatness. Fixing the face cutting machine to the tie rods of the die casting machine will make it easy to finish the die mounting surfaces of the platens in a high parallelism with each other.

Since the face cutting machine employed in the present invention is portable and has a compact construction, the machining accuracy of the face cutting machine is not very high as compared with that of the ordinary stationary face cutting machine. However, a desired flatness of the die mounting surfaces of the platen is a comparatively low flatness and the compact, portable face cutting machine is capable of finishing the die mounting surfaces of the platens in a flatness within 1/10 mm. Although the higher the flatness of the die mounting surfaces, the higher is the accuracy to size, a higher flatness increases both the time and the cost of the partially worn die mounting surface correcting operation. Furthermore, even if the die mounting surfaces are finished in a flatness higher than a flatness of 1/100 mm, the accuracy to size of the die-cast molding does not increase in proportion to the time required for finishing the die mounting surfaces of the platens in such a high flatness. Accordingly, it is advantageous that the flatness of the die mounting surfaces of the platens is in the range of 1/100 to 1/10 mm.

The face cutting machine employed in the present invention may be mechanically similar to the ordinary stationary face cutting machine. For example, the face cutting machine may be such as comprising a machining head capable of rotating or reciprocating a cutting tool, a driving mechanism for driving the machining head for longitudinal or lateral sliding or swinging movement, and a frame for supporting the driving mechanism. The use of an ordinary grinding machine or flame gauging process instead of the face cutting machine is unable to finish the die mounting surfaces of the platens in a flatness within 1/10 mm.

Although it is general that both the stationary platen and the movable platen are formed of cast iron or cast steel, the present invention is applicable to correcting the partially worn die mounting surfaces of the stationary platen and the movable platen of a die casting machine when either of the stationary platen or the movable platen is formed of cast iron and the other is formed of cast steel.

BRIEF DESCRIPTION OF THE DRAWINGS

The above and other objects, features and advantages of the present invention will become more apparent from the following description taken in connection with the accompanying drawings, in which.

DESCRIPTION OF THE PREFERRED EMBODIMENTS

EXAMPLE

Figure 1:
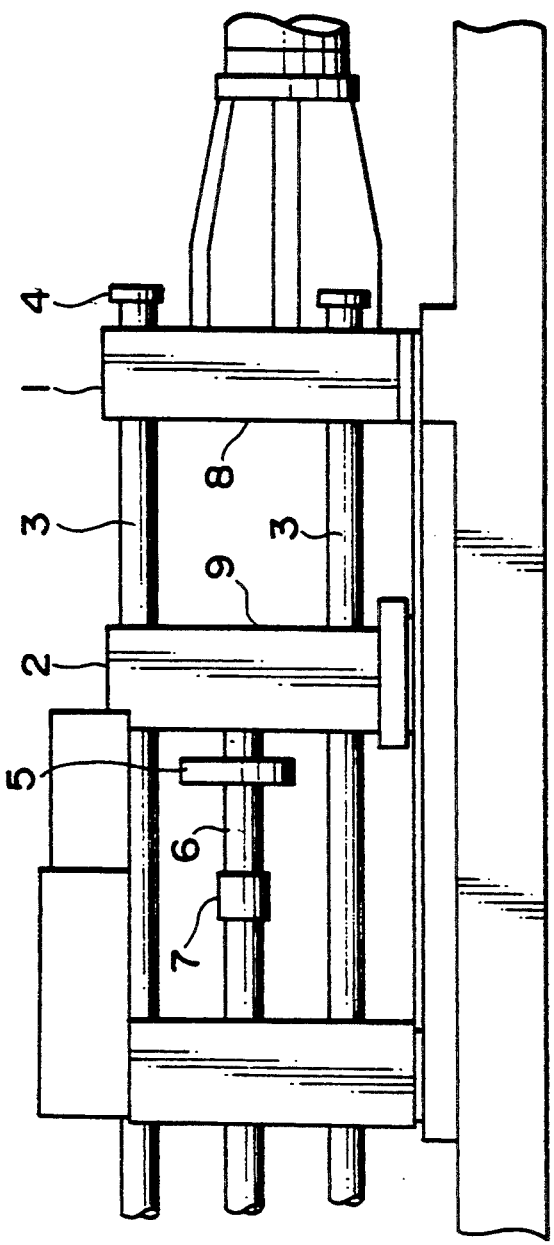
FIG. 1 is a schematic front view of a die casting machine to which a method of correcting the partially worn die mounting surfaces of the stationary platen and the movable platen of a die casting machine, in a preferred embodiment according to the present invention is applied.
Figure 3:
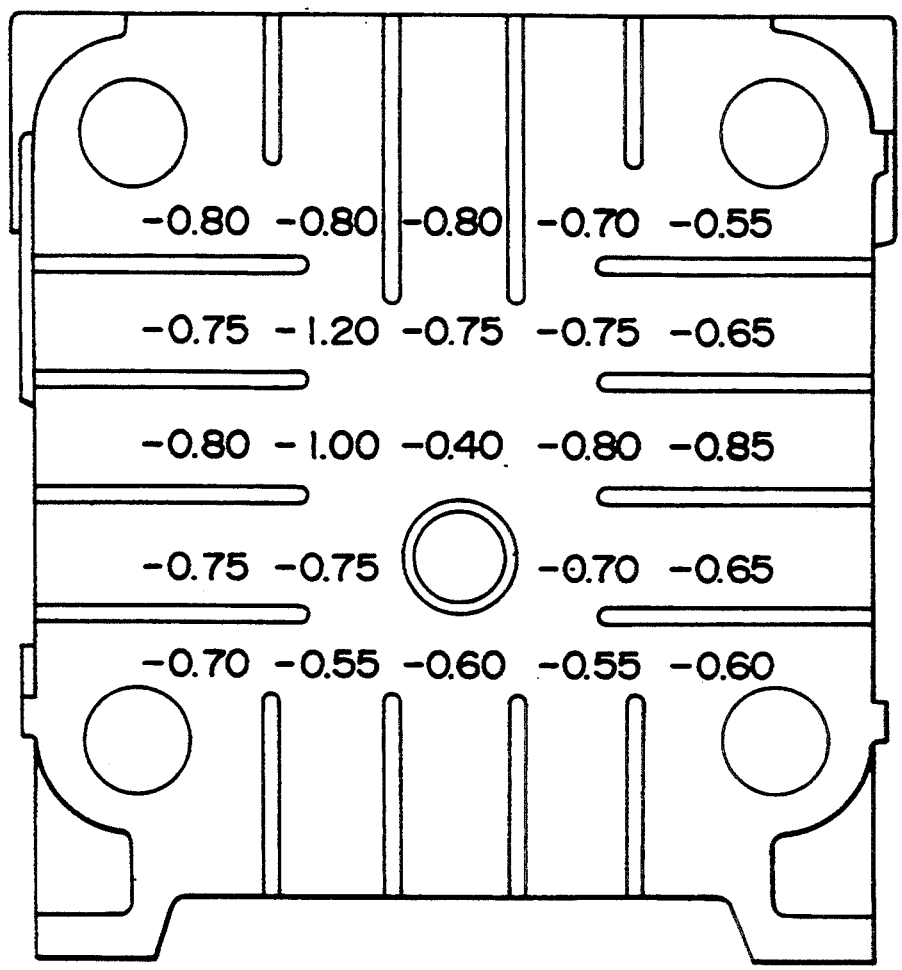
FIG. 3 is a plan view of the stationary platen of the die casting machine of FIG. 1, showing measured values of the depth of partial wear in the die mounting surface.

The stationary die mounting surface 8 of the stationary platen 1 formed of ductile cast iron and the movable die mounting surface 9 of the movable platen 2 formed of ductile cast iron of a die casting machine shown in FIG. 1 capable of clamping a die, not shown, by a clamping pressure of 800 tons were partially worn to an extent requiring correction. In FIG. 3, numerals indicate measured values of the depth in millimeter of partial wear in the stationary die mounting surface 8 of the stationary platen 1 from a datum plane including unworn areas in the stationary die mounting surface 8.

The partially worn stationary die mounting surface 8 and the partially worn movable die mounting surface 9 were corrected by a partial wear correcting method in a preferred embodiment according to the present invention.

The stationary die mounting surface 8 and the movable die mounting surface 9 were cleaned to remove oils and dust from the die mounting surfaces 8 and 9, and then welding areas including partially worn areas and areas surrounding the partially worn areas were padded by hand build-up welding using a coated electrode having a Ni content of 95%. Welding conditions were 130 A in welding current I, 20 V in welding voltage E, 20 cm/min in average welding speed v, and 7,800 J/cm in welding heat input calculated by using expression (1). The welding areas were padded so that cutting allowances are in the range of 1.5 to 2 mm.

Figure 2:
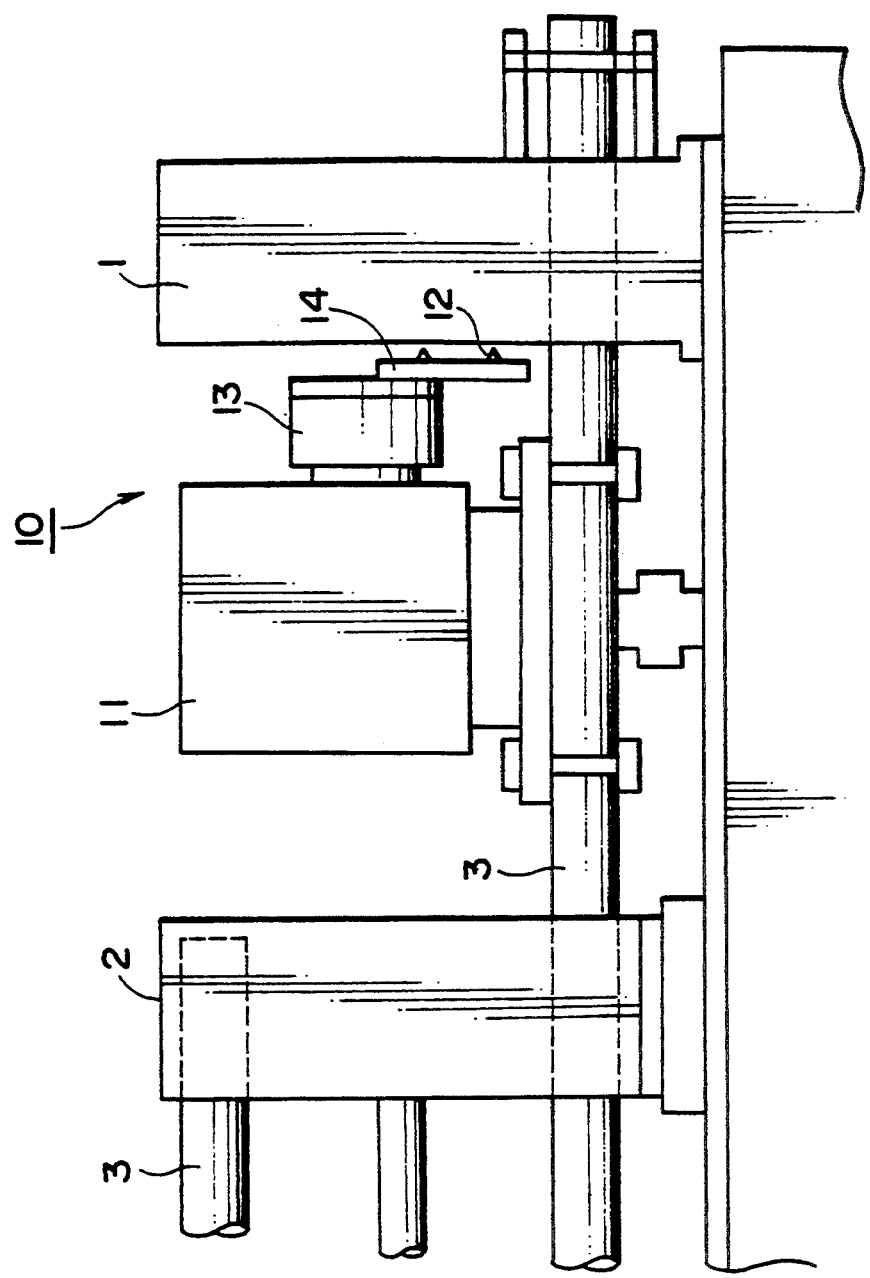
FIG. 2 is a front view of a compact, portable face cutting machine employed in the embodiment of the present invention as installed on the die casting machine of FIG. 1.

Then, as shown in FIG. 2, the upper tie rods 3 were retracted so that the one end thereof is pulled into the movable platen 2. A compact, portable face cutting machine 10 was disposed between the stationary platen 1 and the movable platen 2 on the lower tie rods 3 of the die casting machine and the lower end of the frame 11 of the face cutting machine 10 was fixed to the lower tie rods 3. The compact, portable face cutting machine 10 is a milling cutter specially fabricated for carrying out the partially worn surface correcting method of the present invention. The face cutting machine 10, i.e., the milling cutter, has a machining head 13 for rotating an arbor 14 holding cutting tools 12, and a driving mechanism for driving the machining head 13 for swing motion mounted on the frame 11. The dimensions of the face cutting machine 10 are determined so that the face cutting machine 10 can be installed between the stationary platen 1 and the movable platen 2.

Then, the padded areas on the platens 1 and 2 mounted on the die casting machine were cut by the face cutting machine 10 to finish the stationary die mounting surface 8 and the movable die mounting surface 9 of the platens 1 and 2 in flat surfaces, in which the stationary die mounting surface 8 was finished first, the face cutting machine 10 was turned through an angle of 180° on the lower tie rods 3, the face cutting machine 10 was fixed again to the lower tie rods 3, and then the movable die mounting surface 9 was finished.

Figure 4:
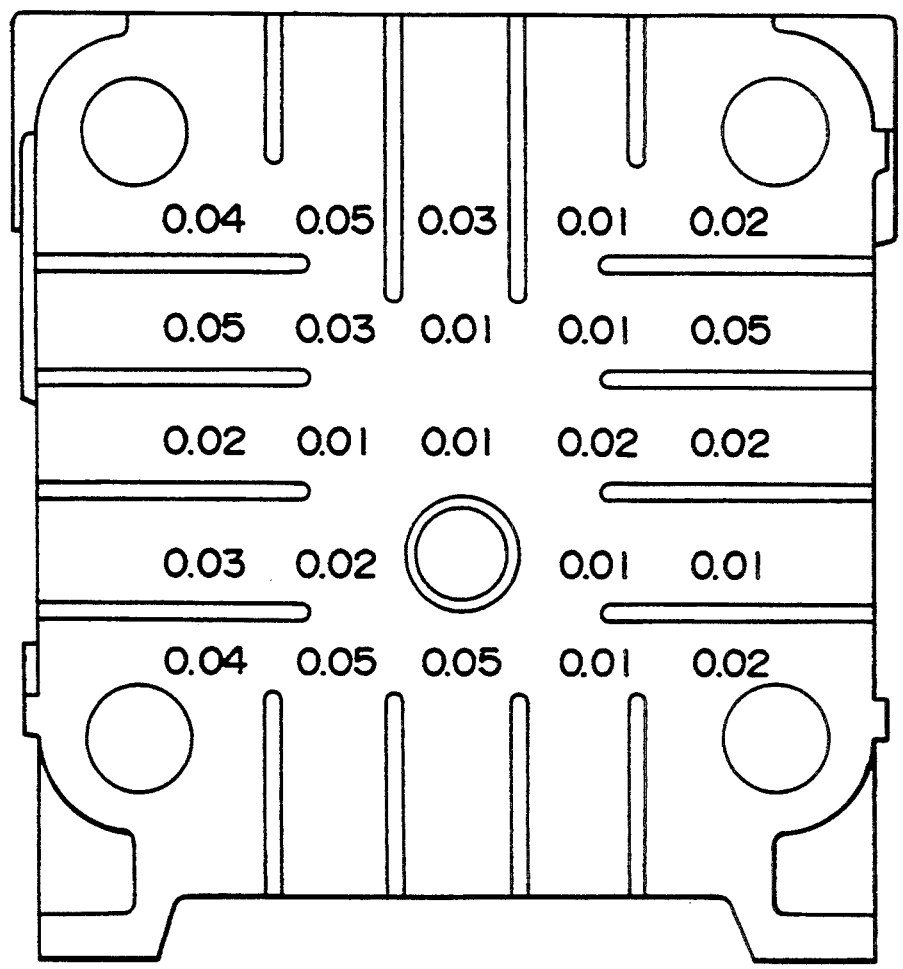
FIG. 4 is a plan view of the stationary platen of FIG. 3 after the correction of partial wear, showing measured values representing the flatness of the die mounting surface.

Then, the face cutting machine 10 was removed from the die casting machine and the positions of measuring points in the stationary die mounting surface 8 relative to a datum plane, and the positions of measuring points on the movable die mounting surface 9 relative to a datum plane were measured to determine the flatness of the stationary die mounting surface 8 and the flatness of the movable die mounting surface 9. In FIG. 4, numerals indicate distances of the measuring points in the stationary die mounting surface 8 from the datum plane. As shown in FIG. 4, the flatness of the stationary die mounting surface 8 was 5/100 mm. The flatness of the movable die mounting surface 9 was substantially equal to that of the stationary die mounting surface 8. It was proved through the inspections including the nondestructive inspection of the die mounting surfaces 8 and 9 that no defect, such as a weld crack, was found in the die mounting surfaces 8 and 9, there was substantially no residual stress in the platens 1 and 2, and the partially worn die mounting surfaces 8 and 9 were satisfactorily corrected. The time spent for all the processes of correcting the partially worn die mounting surfaces 8 and 9, i.e., the down time of the die casting machine, was three days.

Comparative Example

The die mounting surfaces in a partially worn condition similar to that of the previously described die mounting surfaces 8 and 9 of a die casting machine similar to that previously described with reference to FIG. 1 were corrected by the conventional partially worn die mounting surface correcting method.

The die was removed from the die casting machine, and the stationary platen 1 and the movable platen 2 were dismounted from the die casting machine. When dismounting the platens 1 and 2 from the die casting machine, the tie rod nuts 4 were removed, the four tie rods 3 were drawn out from the platens 1 and 2, the movable platen driving system including a push plate 5, guide rods 6 and a toggle 7 was disassembled, and the accessories and the piping was removed, which required very troublesome work.

The platens 1 and 2 were transported to the machining shop of the manufacturer of the die casting machine, and the partially worn stationary die mounting surface of the stationary platen 1 and the partially worn movable die mounting surface of the movable platen 2 were machined on an ordinary stationary face cutting machine to finish the stationary die mounting surface and the movable die mounting surface in a flatness of 5/100 mm. Then, the platens 1 and 2 were transported to the die casting foundry, the platens 1 and 2 were mounted on the die casting machine and the die casting machine was reassembled.

The time spent for all the processes of correcting the partially worn stationary die mounting surface and the partially worn movable die mounting surface, i.e., the processes of disassembling the die casting machine through the process of reassembling the same, was forty days.

Thus, the partially worn die mounting surface correcting method of the present invention does not need the processes of disassembling the die casting machine, removing the platens from the die casting machine, transporting the platens to the machining shop, attaching the platens to the bed of the stationary face cutting machine, taking down the platens from the stationary face cutting machine, transporting the platens to the die casting foundry, mounting the platens on the die casting machine and reassembling the die casting machine, which are necessary for correcting the partially worn die mounting surfaces of the platens by the conventional partially worn die mounting surface correcting method, and needs only a short time. Thus, the partially worn die mounting surface correcting method of the present invention requires very simple work and reduces the down time of the die casting machine, which is economically advantageous.

Although the invention has been described in its preferred form with a certain degree of particularity, obviously many changes and modifications are possible in the light of the above teachings. It is therefore to be understood that the present invention may be practiced otherwise than as specifically described herein without departing from the scope and spirit thereof.

What is claimed is:

1. A method of correcting the partially worn die mounting surfaces of the stationary and the movable platen of a die casting machine, said method comprising steps of:
    padding welding areas including partially worn areas and areas surrounding the partially worn areas in the die mounting surfaces of the platens on the die casting machine by build-up welding;
    disposing a compact, portable face cutting machine near the platens; and
    cutting the padded areas by the face cutting machine to finish the die mounting surfaces of the platens in a desired flatness.

2. A method of correcting the partially worn die mounting surfaces of the stationary and the movable platen of a die casting machine according to claim 1, wherein the platens are formed of cast iron, and the build-up welding employs a low-temperature Ni-base coated electrode having a Ni content of 50% or above and is carried out under welding conditions realizing a welding heat input of 15,000 J/cm or below.

3. A method of correcting the partially worn die mounting surfaces of the stationary and the movable platen of a die casting machine according to claim 1, wherein the platens are formed of cast steel, and the build-up welding employs a stainless steel welding material and is carried out under welding conditions realizing a welding heat input of 15,000 J/cm or below.

4. A method of correcting the partially worn die mounting surfaces of the stationary and the movable platen of a die casting machine according to any one of claims 1 to 3, wherein the face cutting machine is disposed between the stationary die mounting surface of the stationary platen and the movable die mounting surface of the movable platen.

5. A method of correcting the partially worn die mounting surfaces of the stationary and the movable platen of a die casting machine according to claim 4, wherein the die mounting surfaces of the platens are finished in a flatness in the range of 1/100 to 1/10 mm.

6. A method of correcting the partially worn die mounting surfaces of the stationary and the movable platen of a die casting machine according to any one of claims 1 to 3, wherein the die mounting surfaces of the platens are finished in a flatness in the range of 1/100 to 1/10 mm.

* * * * *